Feb. 14, 1967 — W. G. SMITH — 3,304,089
FOOTBALL PRACTICE DEVICE

Filed March 13, 1964 — 3 Sheets-Sheet 1

INVENTOR.
WARREN G. SMITH
BY Kimmel & Crowell
ATTORNEYS.

Feb. 14, 1967 W. G. SMITH 3,304,089
FOOTBALL PRACTICE DEVICE
Filed March 13, 1964 3 Sheets-Sheet 2

INVENTOR.
WARREN G. SMITH
BY
Kimmel & Crowell
ATTORNEYS.

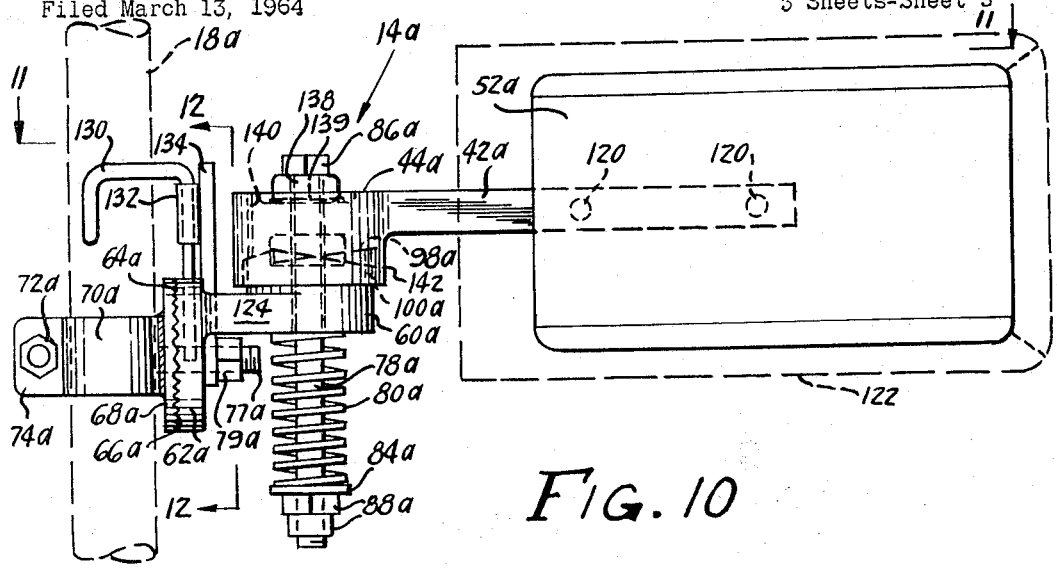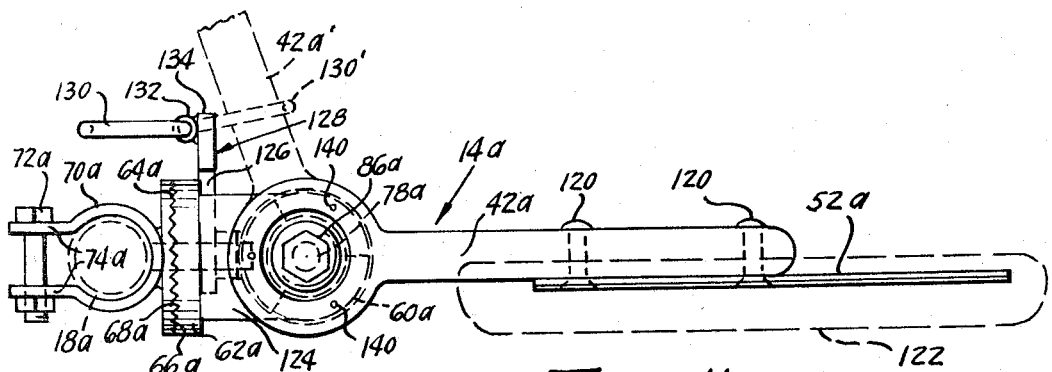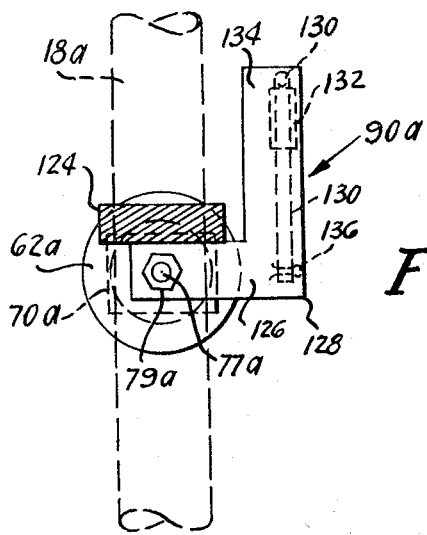

United States Patent Office 3,304,089
Patented Feb. 14, 1967

3,304,089
FOOTBALL PRACTICE DEVICE
Warren G. Smith, 805 Burkwood Drive,
Urbana, Ill. 61801
Filed Mar. 13, 1964, Ser. No. 351,731
15 Claims. (Cl. 273—55)

This invention relates to a football practice device and more particularly to a device for training the ball carrier.

As conductive to a better understanding of the instant invention, it is well known that there are many devices known as "sleds" on the market for the training of linement such as the guards and tackles on a football team. The instant application is directed to a device for training the ball carrier by providing him with impact simulating the contact of one or more defensive players thereby teaching him ball possession and control and reducing fumbles.

A primary object of this invention is the provision of a football training device which is sturdy and durable in construction, reliable and efficient in operation, and relatively simple and inexpensive to manufacture, assemble, utilize, and maintain.

Another object of the instant invention is the provision of a football practice device having a plurality of spring loaded impact arms for engagement by a football player, particularly a ball carrier, to give him practice in maintaining his grip on the ball under attack from defensive players, and to develop leg drive for both ball carriers and linemen.

Another object of this invention is the provision of a device of the type described wherein the individual impact arms are vertically adjustable to provide impact at different points of the football player's body, rotatable about a substantially horizontal axis to provide impact at different angles and adjustably spring loaded to allow the same device to be used for football players of different ages and experience, such as junior high school, high school, college, and professional.

A further object of the instant invention is the provision of such a device having a frame means with a plurality of frame or standard members on each side of the same whereby impact arms may be carried by such members in longitudinally spaced relationship to provide depth to the field of impact.

A still further object of the instant invention is the provision of a football practice device having a plurality of impact arm assemblies, selective ones of which may be retracted to an out-of-the-way position with lock means carried thereby for retaining the same in their retracted position.

Yet another object of this invention is the provision of a football practice device having a plurality of impact arm assemblies normally retained in a first position in the path of travel of a football player utilizing the same, and movable therefrom by the impact of the player, with biasing means to hinder the movement from the first position and spring means to return the assemblies to their first position after the player has hit and penetrated the device.

Other and further objects reside in the combination of elements, arrangement of parts, and features of construction.

Still other objects will in part be obvious and in part be pointed out as the description of the invention proceeds and as shown in the accompanying drawings wherein:

FIGURE 10 is a fragmentary side elevational view of a modified impact arm assembly, showing a standard member carrying the same and a pad and cover carried thereby in dotted lines;

FIGURE 11 is a top plan view of the assembly of FIGURE 10 taken substantially on line 11—11 and showing part of the impact arm held in retracted position by a modified lock means; and FIGURE 12 is a transverse cross-sectional view taken substantially on line 12—12 of FIGURE 10.

Similar reference characters refer to similar parts throughout the several views of the drawings.

Figures 1, 2:
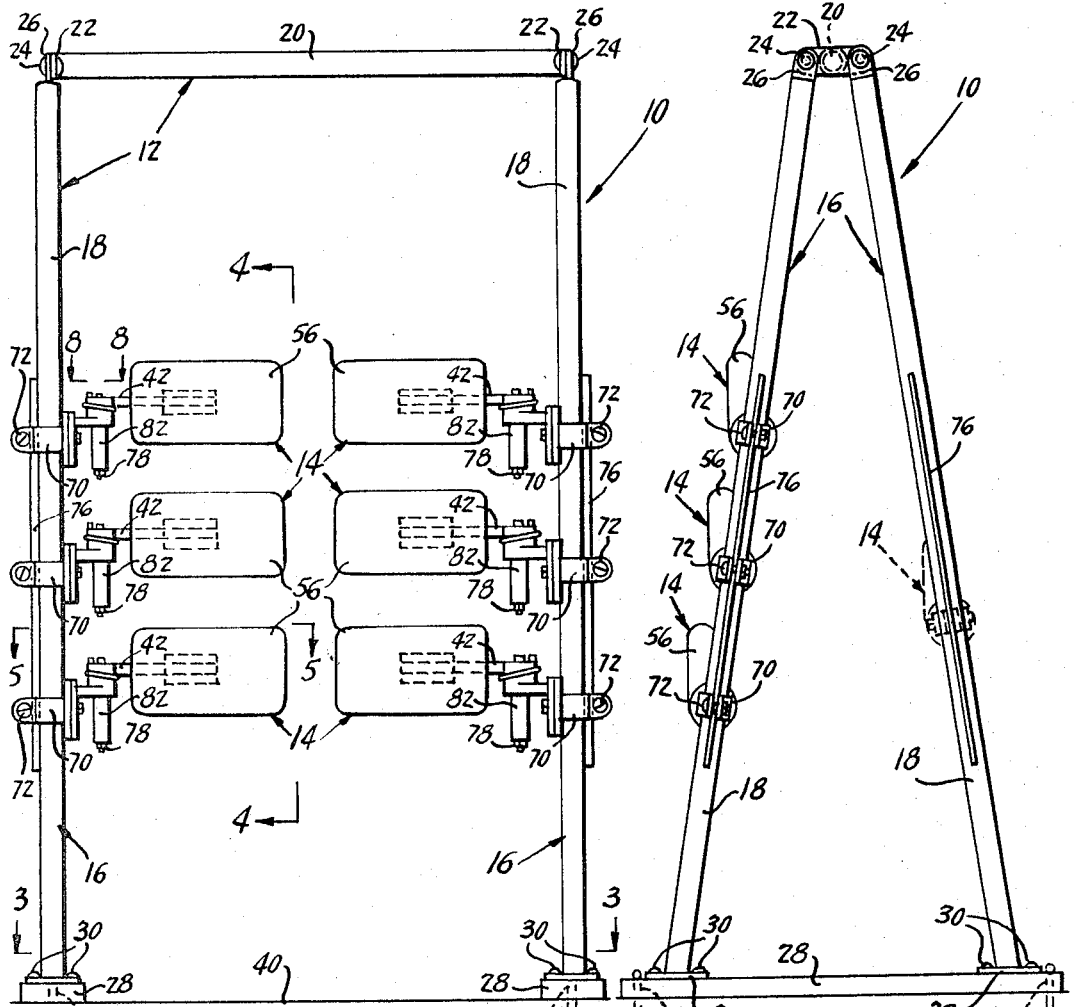
FIGURE 1 is a front elevational view of a football practice device in accordance with the instant inventive concept, anchoring means being shown in dotted lines.
FIGURE 2 is a side elevational view of the same with an impact arm assembly carried by the rear standard of the frame means being shown in dotted lines as illustrative.
Figure 8:
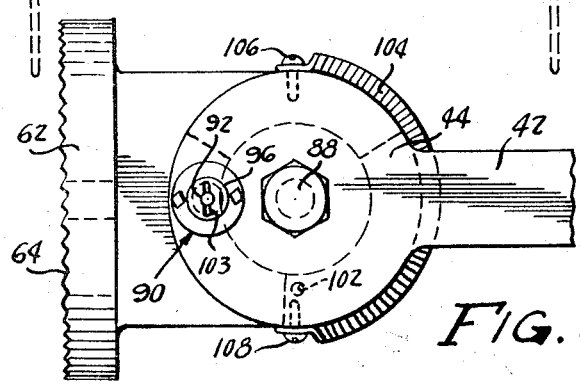
FIGURE 8 is a fragmentary enlarged top plan view of a portion of the pivot means for one of the impact arm assemblies, taken substantially on line 8—8 of FIGURE 1 with certain hidden parts being shown in dotted lines.
Figure 3:
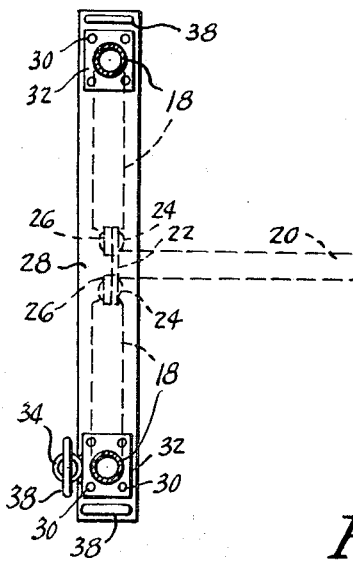
FIGURE 3 is an enlarged transverse cross-sectional view taken substantially on line 3—3 of FIGURE 1 with the upper portion of the frame means being shown in dotted lines for clarity.

Referring now to the drawings, and more particularly to FIGURES 1–9, one embodiment of a football practice device in accordance with the instant inventive concept is designated generally by the reference numeral 10 and comprises basically a frame means 12 and a plurality of impact arm assemblies 14.

The frame means 12 includes a pair of inverted substantially V-shaped frame members 16 each comprised of two standard members 18, an overhead cross bar 20 having outstanding ears 22 secured by bolts or the like 24 to flattened lugs 26 adjacent the top of each standard member 18, and a pair of pads 28 formed of wood or the like and secured by bolts 30 to foot members 32 on the lower ends of each standard member 18. A plurality of anchoring rings 34 and/or anchoring bores 36 may be carried by the pad 28 for the reception of anchoring stakes 38 receivable in a supporting surface 40, such as the ground or the like, and defining an anchoring means for the frame means 12. It is to be understood that the frame means disclosed in the drawings is intended merely as exemplary and that other comparable frame means may be substituted therefor. For example, instead of the inverted substantially V-shaped frame member 16, a single vertically extending standard member (not shown) may be provided with anchoring means which would be obvious to those with ordinary skill in the art for securing the same to a supporting surface such as the ground or other supporting surfaces such as a gymnasium floor or the like. It is preferable that the frame means includes at least two longitudinally spaced standard members on each side in order to provide depth to the impact field as will be explained in more detail hereinafter.

Figure 5:
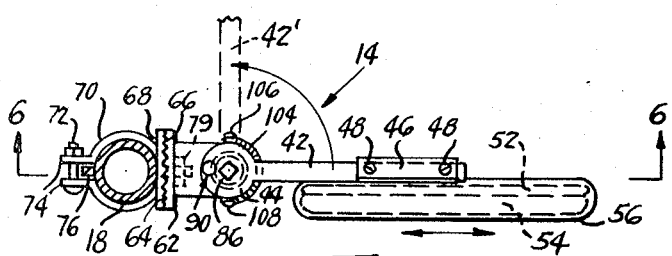
FIGURE 5 is an enlarged fragmentary transverse cross-sectional view showing one of the impact arm assemblies taken substantially on line 5—5 of FIGURE 1 and showing a portion of the retracted position of the assembly in dotted lines.
Figure 6:
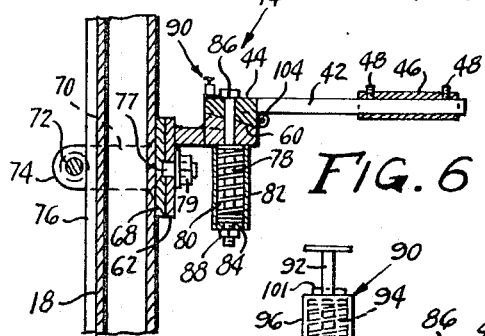
FIGURE 6 is a fragmentary vertical cross-sectional view taken substantially on line 6—6 of FIGURE 5.
Figure 7:
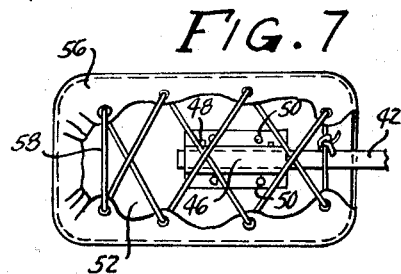
FIGURE 7 is a fragmentary rear elevational view of a portion of one of the padded impact arms.
Figure 9:
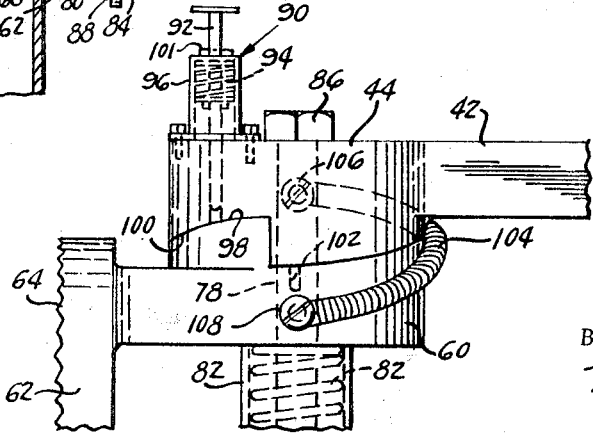
FIGURE 9 is a fragmentary side elevational view of a portion of the device shown in FIGURE 8.

Each impact arm assembly 14 includes an impact arm 42 carrying an upper cam means 44 at one end and slidably receiving a tubular clamp 46 fixed thereto in laterally adjustable relationship as indicated by the double-headed arrow in FIGURE 5 by set screws 48. The tubular clamp 46 is secured by screws or the like 50 to an impact plate 52 having a pad member 54 fixed thereover by a cover means 56 secured in place by string or the like 58.

Each impact arm assembly 14 further includes a lower cam means 60 carried by a plate 62 having a serrated face 64 which comates with a serrated face 66 on another plate 68 carried by a clamp 70 which circumscribes one of the standard members 18 and is releasably secured in vertically adjusted relation by a tightening means 72 in the form of a nut and bolt or the like passing through spaced ears 74. A vertical guide element 76 is preferably carried by each standard member 18 in order to facilitate vertical adjustment of the impact arm assemblies 14 while maintaining alignment thereof. The plate 68 carries a bolt 77 which passes centrally through the plate 62 and receives a lock nut 79 to allow for angular adjustment of the impact arm assemblies 14.

Each assembly 14 further includes a pivot pin 78 in the form of a machine bolt or the like, a portion of the same extending centrally through aligned smooth bores in the cam means 44 and 60 with the remainder extending beyond the cam means 60 and being circumscribed by a high pressure steel spring 80 preferably of rectangular wire construction carried within a sleeve 82 with one end abutting the bottom of the cam means 60 and the other end abutting a plate member 84 (note particularly FIG. 6) slidingly received within the sleeve 82, with the head 86 of the pivot pin 78 above the upper cam means 44 and a lock nut 88 threadably secured to the opposite end of the pivot pin 78 below the plate 84. Any conventional bearing means and lubricating means may be incorporated. The coil spring 80 defines a biasing means which normally retains the impact arms 42 in a first position such as shown in full lines in FIGURE 5 and to provide pressure to hinder movement away from the first position against the impact of a player passing between the frame member 16 and contacting the padded arms.

The impact arms 42 are capable of movement about the pivot pin 78 from the first position mentioned above to a second position shown at 42' in dotted lines in FIGURE 5 wherein they extend in a second plane at least approximately 90° offset from the first plane and out of the way of a football player running through the device of the instant invention. In order to retain the impact arms 42 in the second position, a lock means is provided, one embodiment of same being shown at 90 as comprising a pin means 92 biased downwardly by a spring means 94 carried within a sleeve 96 secured to the upper cam means 44, the lower portion of the pin means 92 being spaced from the cam surface 98 of the lower cam means 60, which comates with the cam surface 100 of the upper cam means 44 during operation of the device by a pair of outstanding ears 101 engaging the top of the sleeve 96, a recess 102 (note particularly FIGURE 9) being provided in the lower cam surface 98 to receive the end portion of the pin means 92 when the impact arm 42 has been moved to its second position and the pin means 92 has been rotated to align the ears 101 with a slot 103 in the top of the sleeve 96.

A return spring means 104 may be provided having its opposite ends secured to screws 106, 108 carried by the upper and lower cam means 44, 60, respectively, to automatically return the impact arms 42 to their first position after the player has hit the same and continued through the device, in the event that the urging of the biasing means is insufficient or not fast enough.

Figure 4:
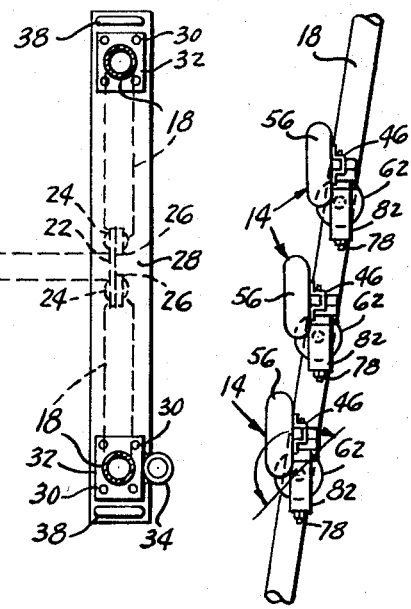
FIGURE 4 is a fragmentary side elevational view through the center of the device taken substantially on line 4—4 of FIGURE 1.

The use and operation of the device of the instant invention will now be apparent. The frame means 12 is positioned in a desirable location, anchoring means such as 38 being used to secure the same in place if a soft supporting surface such as the ground is available, or other conventional anchoring or securing means being utilized to maintain the frame means in a fixed relationship. The impact arm assemblies 14 are vertically positioned on the standard members 18 by loosening the tightening means 72 and sliding the clamp 70 along the standard member 18 and the guide member 76 to a desired location after which the tightening means 72 is secured. The impact arm assemblies are usually arranged in pairs as shown, for example, in FIGURE 1, the individual impact arms of each pair being carried by opposed frame members and extending towards each other, with the inner ends of the impact arms of each pair being spaced from each other to engage opposite sides of the player as he drives between the frame members 16. The assemblies 14 may be positioned at any level, depending upon the particular experience to be given to the player. For example, the upper pair of assemblies 14 may be at shoulder level, the intermediate pair at hip level, and the lower pair at thigh level. The angle of impact for each assembly 14 is readily varied by loosening the lock nut 79 and rotating the serrated faces 64, 66 of the plates 62, 68 with respect to each other to move the padded arm to any of the positions shown by the double-headed arcuate arrow in FIGURE 4. Variation in the angle provides closer simulation to the contact with defensive players and further allows for close association of the padded portion with the particular body portion it is to contact. For example, the lower assemblies can have their padded arms turned in a counterclockwise direction as seen in FIGURE 4 so that the face of the same is tilted at an angle corresponding to the raised thighs of a player driving through the device. The magnitude of restraint or hindrance provided against the impact of the player can also readily be varied by tightening or loosening the lock nut 88 on the pivot pin 78. Selected assemblies can be moved to the retracted position 42' seen in FIGURE 5 and additional assemblies may be provided on the rear standard as shown at 14' in dotted lines in FIGURE 2 to provide a depth to the impact field. A trainer or coach may preselect a particular relationship of the many variables provided for in the impact arm assemblies 14 to present a particular situation to the player. Also, the trainer may vary the arrangement of the assemblies 14 so that the player will meet an unexpected situation as he runs between the frame members 16. Upon impact of the player's body with the padded arms, the cam members 44, 60 are rotated with respect to each other against the restraint of the spring means 80, the return spring means 104 moving the impact arms 42 back to their first position after the player has completed his run. The lock means 90 are utilized in an obvious manner to retain selected impact arms in their retracted position.

Referring now particularly to FIGURES 10–12, a modified construction of certain of the parts is shown with elements similar to the embodiment of FIGURES 1–9 being designated by like reference characters followed by the suffix a. The modified impact arm assembly 14a includes an impact arm 42a carrying an upper cam means 44a at one end and riveted at 120 to a backing impact plate 52a carrying a pad and cover 122 fixed thereover. A lower cam means 60a is connected by an arm 124 to a plate 62a having a serrated face 64a which comates with a serrated face 66a on plate 68a carried by clamp 70a circumscribing one of the standards 18a like the embodiment of FIGURES 1–9 and being tightened by nut and bolt 72a passing through spaced ears 74a.

A bolt 77a passes from plate 68a through plate 62a and over leg 126 of an L-shaped bracket 128 forming part of a modified lock means 90a, a lock nut 79a allowing for angular displacement of the assembly 14a.

The lock means 90a includes a lock pin 130 slidably carried by a sleeve 132 fixed to the rear of the other leg 134 of the L-shaped bracket 128, a cotter pin or the like 136 being provided to limit the sliding movement. The lock pin 130' may be engaged over the impact arm 42a' as shown in FIG. 11 in the retracted position of the assembly.

The modified assembly 14a includes a pivot pin 78a extending centrally through a smooth bore defined in the cam means 44a and the cam means 60a with the portion extending beyond the cam means 60a circumscribed by a spring 80a having its opposite ends abutting the bottom of the cam means 60a and the plate member 84a, lock nuts 88a being secured at one end, a thrust bearing means 138 and a washer 139 being interposed under the head 86a at the other end.

Oil apertures 140 may be included for lubricating the opposed cam faces 98a and 100a.

In the embodiment of FIGURES 10-12, the upper cam means 44a includes a depending peripheral sleeve 142 rotatably surrounding the lower cam means 60a.

The modified elements of the embodiment of FIGURES 10-12 can be utilized with the remainder of the device as shown in FIGURES 1-9 and various elements from the two embodiments may be combined where applicable to provide optimum results.

It is understood that the biasing means shown in the drawings could be replaced by other conventional biasing means which normally retains the impact arms in a first position and to provide pressure to hinder movement.

It is understood that although this invention relates to a football practice device it is readily adaptable to use in other sports and programs where physical development and/or simulated body contact is required.

It will now be seen that there is herein provided an improved football training device which satisfies all of the objectives of the instant invention and others, including many advantages of great practical utility and commercial importance.

Since many embodiments may be made of the instant inventive concept, and since many modifications may be made of the embodiments hereinbefore shown and described, it is to be understood that all matter herein is to be interpreted merely as illustrative, and not in a limiting sense.

I claim:

1. A football practice device comprising a frame means, said frame means including at least two laterally spaced frame members, at least one impact arm assembly carried by each frame member, said impact arm assemblies each including an impact arm carrying an impact plate and pivot means to allow said impact arm to be moved between a first position wherein said impact plate extends in a first plane passing between said frame members and a second position wherein said impact plate extends in a second plane at least approximately 90° offset from the first plane, biasing means operatively carried by each impact arm to normally retain said impact plate in said first position and hinder movement away from said first position, and lock means operatively carried by each impact arm assembly, said lock means selectively retaining said impact arm assembly in said second position.

2. The structure of claim 1 further including, in combination, anchoring means for securing said frame means to a supporting surface.

3. The structure of claim 1 wherein a plurality of vertically spaced impact arm assemblies are carried by each frame member.

4. The structure of claim 3 wherein said impact arm assemblies are arranged in pairs, the individual impact arms of each pair of said impact arm assemblies being carried by opposed frame members and extending toward each other, the inner ends of said impact plates of each pair being spaced from each other in said first position.

5. The structure of claim 1 wherein each of said frame members includes at least two longitudinally spaced standard members and at least one impact arm assembly carried by each standard member.

6. The structure of claim 5 wherein each frame member includes two standard members substantially defining an inverted V-shape.

7. The structure of claim 1 wherein each impact arm assembly is vertically adjustable on its associated frame member.

8. The structure of claim 1 wherein each impact arm is rotatable about a substantially horizontally extending axis.

9. The structure of claim 1 wherein said biasing means are adjustable.

10. The structure of claim 1 wherein each impact plate is horizontally adjustable on its associated impact arm.

11. The structure of claim 1 wherein said impact plates are padded.

12. The structure of claim 1 wherein said lock means includes a lock pin having a U-shaped upper end, sleeve means slidably and rotatably carrying said lock pin, said upper end being engaged over a portion of said impact arm to retain the same in said second position.

13. A football practice device comprising a frame means, said frame means including at least two laterally spaced frame members, at least one impact arm assembly carried by each frame member, said impact arm assemblies each including an impact arm carrying an impact plate and pivot means to allow said impact arm to be moved between a first position wherein said impact plate extends in a first plane passing between said frame members and a second position wherein said impact plate extends in a second plane at least approximately 90° offset from the first plane, and biasing means operatively carried by each impact arm to normally retain said impact plate in said first position and hinder movement away from said first position, said pivot means including a vertically extending pivot pin and a pair of cam means having comating camming surfaces, a portion of said pin means extending centrally through said cam means, and the remainder of said pin means extending beyond one of said cam means, said biasing means including a coiled spring means surrounding the portion of said pin means extending beyond said cam means and urging said camming surfaces toward each other to thereby bias said impact arm assembly toward said first position.

14. The structure of claim 13 further including, in combination, a return spring means having opposite ends secured to said two cam means to return said impact arm to said first position after it has been moved therefrom.

15. The structure of claim 13 further including, in combination, a lock means including a spring pressed pin means carried by one of said cam means and having an end portion normally spaced above the cam surface of the other of said cam means, ears carried by said pin means and retaining the end of the same out of engagement with said other cam surface, slot means cooperating with said ears to allow the end of said pin means to be slidingly received on said other cam surface and a recess defined in said other cam surface to receive said end portion of said spring-pressed pin means when said impact arm has been moved to said second position.

References Cited by the Examiner
UNITED STATES PATENTS

| | | | |
|---|---|---|---|
| 1,762,435 | 6/1930 | Brett | 273—55 |
| 2,752,155 | 6/1956 | Nedwick | 272—57 |

RICHARD C. PINKHAM, *Primary Examiner.*

L. J. BOVASSO, *Assistant Examiner.*